July 24, 1923.
F. G. WHITTINGTON
SPEED ADAPTER JOINT FOR POWER TRANSMITTING SHAFTS
Filed April 14, 1922
1,462,675
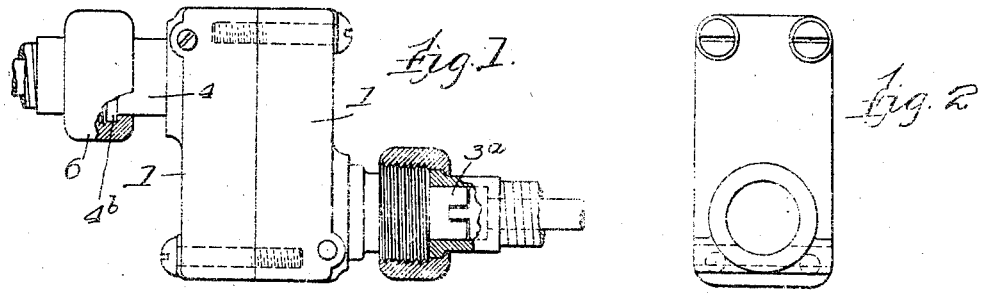
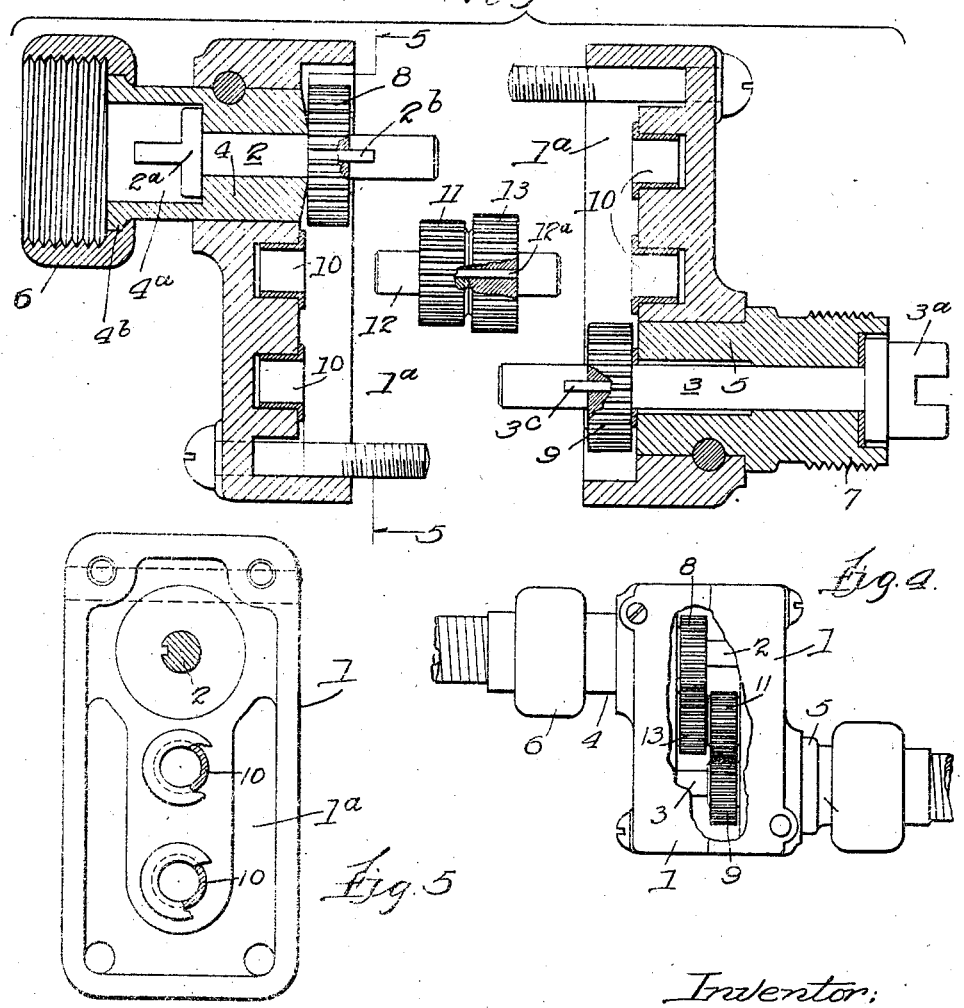
Inventor:
Frederik G. Whittington,
by Burton & Burton
his Attys.

Patented July 24, 1923.

1,462,675

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

SPEED-ADAPTER JOINT FOR POWER-TRANSMITTING SHAFTS.

Application filed April 14, 1922. Serial No. 552,766.

*To all whom it may concern:*

Be it known that I, FREDERIK G. WHITTINGTON, a citizen of the United States, having residence in Evanston, in the county of Cook and State of Illinois, have invented certain new and useful Improvements in Speed-Adapter Joints for Power-Transmitting Shafts, of which the following is a specification, reference being had to the accompanying drawings, forming a part thereof.

The purpose of this invention is to provide an improved construction in a speed adapter joint for interposition in a proper transmitting shaft, particularly for use in connection with a flexible shaft for changing the speed between the two shaft parts between which it is interposed. It consists in the elements and features of construction shown and described, as indicated in the claims.

In the drawings:—

Figure 1 is a side elevation, partly sectional, of a device embodying this invention, section being made axially with respect to one terminal.

Figure 2 is an outer side elevation of either member of the casing, the two members being identical in form.

Figure 3 is a dissected sectional view of the device, section being axial with respect to the driving and driven shaft members, the two casing members being separated and the third shaft and its gear being shown in dissected position between the casing members.

Figure 4 is a view similar to Figure 1, except that it is not sectional in any part, and that the casing is partly broken away to disclose the gear therein, the gears being shown transposed from the positions and arrangement indicated in Figures 1 and 3.

Figure 5 is an interior view of one of the casing members.

The structure shown in the drawings comprises two casing members, 1, 1, which are identical in form and construction, having one face recessed forming portion of a cavity to be rendered continuous, constituting a grease chamber, when the two members are mounted face to face at their open sides, with said cavities, 1ª, aggregated. In each of said casing members there is journaled a shaft having one end protruding at the open or cavity side of the casing member, and the other end protruding at the other side for coupling with a driving or driven shaft. In the left hand casing member, 1, referring to Figure 1 and Figure 3, the journaled shaft indicated at 2 has its exteriorly protruding end, $a$, furnished with a male coupling terminal, 2ª. In the right hand casing member the shaft indicated at 3, protrudes at its outer end which is provided with a female coupling terminal, 3ª. The casing members are designed to be die-cast of soft metal, and are therefore provided with hard metal journal bushings for the shafts, 2 and 3, the bushing for the shaft, 2, being shown at 4, and being exteriorly counter-bored as seen at 4ª, for housing the male terminal of the shaft, 2, and retaining the female terminal of the shaft to be coupled therewith; and said journal bearing housing has its exterior terminal flanged at 4ᵇ, for stopping an interiorly threaded coupling member, 6, designed for coupling to the casing of a flexible shaft whose rotating member is adapted to be coupled with the shaft, 2, said flexible shaft and its casing not being shown, being of well understood construction. The journal bushing for the shaft, 3, is shown at 5, which is counterbored at the inner end to afford access for grease to the journal bearing at the outer end portion of said shaft. This journal bearing bushing, 7, has its protruding end exteriorly threaded for coupling to the casing of a flexible shaft whose rotated member will have a male terminal for coupling with the female terminal, 3ª, of the shaft, 3, said flexible shaft member not being shown. Each of the shafts, 2 and 3, extends beyond the gear thereon, the said gears being indicated at 8 and 9, respectively, being within the cavities of the casing members respectively, and the shaft ends each projecting into the cavity of the opposite casing member, and across said cavity into bearings provided in said opposite members which are lined with steel bushings, 10. 12 is a shaft which is journaled at its opposite ends in the two casing members respectively, said shaft being of the same diameter as the shafts, 2 and 3, and being provided with steel journal bushings, 10, in said opposite casing members. On the shaft, 12, there are mounted rigid with each other, and if desired, keyed to and thereby rigid with the shaft, two gears, 11 and 13, meshing respectively with the gears, 8 and 9. As shown, these two gears are rigid, not only with each other, but with the shaft, as indicated by the spline, $12^a$, projecting from the shaft and engaging both the gears. The gears, 8 and 9, are removable from their shafts, 2 and 3, respectively, keys, $2^b$ and $3^c$, being shown for securing them for rotation with said shafts, respectively. As noted, all the shafts, 2, 3 and 12, are of the same diameter so that all the gears are interchangeable,—that is, so far as their fitting on the several shafts is concerned, but obviously, can be mated only in pairs which shall have the sum of the diameters of the two gears of the pair, corresponding to the distances between centers of the shafts; and for permitting the maximum variation of arrangement of the gears, the shaft, 12, is equidistant from the two shafts, 2 and 3. The two casing members are secured together by four bolts, one at each corner, two taking through the right hand member and screwing into the left hand member, and two taking through the left hand member and screwing into the right hand member, so that the two casing members may be identically formed in every respect, one die serving to produce them both when they are die-cast.

With the arrangement shown, it will be seen that the shaft, 2, being the initial or driving shaft of the train, and 3, the ultimate or driven shaft, three different speeds may be transmitted to the driven shaft from the same speed of the driving shaft by transposition of the gears. For example, assuming that the ratio of the gears, 8 and 11, is 4 to 3, and that the ratio of the gears, 11 and 13 is as $7\frac{1}{2}$ to $6\frac{1}{2}$—the total diameters of the two pairs being the same, when gear, 8, is on shaft, 2, and meshing with gear, 11, on shaft, 12, the gear, 13, on shaft, 12, meshing with gear, 9, on shaft, 3, a speed of 39, for the shaft, 2, will give a speed of 60, for the shaft 3. By transposing the gears, 8 and 11, placing the gear, 10, on the shaft, 2, and gear, 8, on shaft, 2, the speed change is reversed so that a speed of 52, of the shaft, 2, will yield a speed of 45 of the shaft, 3. Again, by transposing the gears, 13 and 9, a speed of 60 of the shaft, 2, will yield a speed of only 45 of shaft, 3. It will be obvious that by making the diameters of all four gears very nearly the same,—the closest approximation being, of course, one tooth,—very fine changes of speed transmission can be obtained, as is desirable in view of the specific purpose for which the device is intended, which is to interpose in a flexible shaft connected for driving a speedometer of an automobile from one of the ground wheels, and for making such adjustment as to compensate for variation in the diameter of the ground wheel which may result from substitution of a new tire for an old one, so as to render the speed indication correct with both diameters of the wheel.

I claim:—

1. For combination with a power transmitting shaft and to be interposed therein to change the speed as between the two parts between which it is interposed, a two-part casing, each part having a cavity at one side having a journal bearing for a shaft, and a shaft journaled therein and protruding therefrom at the side opposite the cavity; a gear on each shaft at a non-protruding part thereof, said casing parts being mated for seating one against the other to combine their cavities in a single continuous closed chamber, and a third shaft having its ends carried in the two casing parts respectively, and two gears rigid with each other on said third shaft, intermeshing respectively with the gears of the two shafts first mentioned, the two pairs of intermeshing gears being different in respect to their gear ratios for changing the shaft speed in transmission through the gear system comprising said four gears; the gears of the two shafts first mentioned being interchangeable and the two gears on the third shaft being laterally transposable, and means for detachably securing the two casing members together.

2. In the construction defined in claim 1, foregoing, the two gears on the third shaft being rigid therewith and the said third shaft journaled at its opposite ends in said respective casing parts.

3. In the construction defined in claim 1, foregoing, the casing parts being of soft metal, whereby they may be die-cast; hard metal journal bearing bushings being provided for the first mentioned two shafts, said bushings being protruded from the respective casing parts and exteriorly formed for coupling the casing of a flexible shaft, the shafts in said bearings being formed at their outer ends for coupling to the rotating element of a flexible shaft.

4. In the construction defined in claim 1, foregoing, the two shafts first mentioned having their inner ends projecting beyond the gears carried by them respectively for journaling in the opposite casing member, said casing members having journal bearing bushings for journaling said shaft ends respectively.

5. In the construction defined in claim 1, foregoing, the first shaft having the gears thereon rigid therewith and equidistant from the opposite ends of said shaft, and the opposite casing members having journal bearing bushings for said shaft ends.

In testimony whereof, I have hereunto set my hand at Chicago, Illinois, this 11th day of April, 1922.

FREDERIK G. WHITTINGTON.